US006939827B2

(12) United States Patent
Shariat

(10) Patent No.: US 6,939,827 B2
(45) Date of Patent: Sep. 6, 2005

(54) IMAGE-BEARING COMPOSITE ELEMENT AND METHOD OF MAKING SAME

(76) Inventor: Saeed Shariat, 3805 Palos Verdes Dr. N., Rolling Hills Estates, CA (US) 90274

( * ) Notice: Subject to any disclaimer, the term of this patent is extended or adjusted under 35 U.S.C. 154(b) by 2 days.

(21) Appl. No.: 10/137,610

(22) Filed: May 1, 2002

(65) Prior Publication Data

US 2003/0207763 A1 Nov. 6, 2003

(51) Int. Cl.[7] .......................... B41M 5/035; B41M 5/38
(52) U.S. Cl. ............................ 503/227; 8/471; 428/480
(58) Field of Search ............................ 8/471; 428/480; 503/227

(56) References Cited

U.S. PATENT DOCUMENTS 4,668,239 A * 5/1987 Durand .......................... 8/471
4,705,521 A * 11/1987 Byers ............................ 8/471
5,035,764 A 7/1991 Blake
5,242,720 A 9/1993 Blake
5,489,567 A * 2/1996 Koshizuka et al. ......... 503/227
5,902,769 A * 5/1999 DeBoer et al. ............. 503/227

* cited by examiner

*Primary Examiner*—Bruce H. Hess
(74) *Attorney, Agent, or Firm*—Terrell P. Lewis

(57) ABSTRACT

A composite article includes a plurality of plies of composite material arranged atop one another in a stack and bonded together with a resin material, in which the stack includes a layer disposed on at least one outer surface of the stack, the layer bearing an image applied, prior to curing of the composite article, by a sublimation printing process. The layer preferably comprises a polyester material. The image preferably comprises a logo, identification information or any other representation of information or image depiction desired. The application of the image to the layer via sublimation printing results in the image having no height above said sheet. A process for fabricating the composite material article of the present invention includes a first step of forming a stack of plies made from "conventional" composite materials and a "conventional" resin material, a second step of disposing a layer of non-composite material over at least one surface of the stack of plies and incorporating the layer into the stack using the "conventional" resin material, the layer having an image formed on a surface thereof using sublimation printing facing away from said stack, and a third step of curing said stack.

19 Claims, 1 Drawing Sheet

IMAGE-BEARING COMPOSITE ELEMENT AND METHOD OF MAKING SAME

BACKGROUND OF THE INVENTION

1. Field of the Invention

The present invention relates to structural composites, and more particularly to structural composites which bear indicia or designs. Even more particularly, the present invention relates to an article of composite material and a method of making the same in which the article exhibits one or more surface regions bearing indicia or design information which has been applied through a sublimation printing process.

2. Description of the Related Art

The fabrication of structural composite elements, and assemblies made from such elements, to obtain increased strength-to-weight characteristics and other improved properties is well known. Such elements typically are comprised of high strength fibers embedded in a polymer resin matrix. In a similar manner, assemblies of composite materials are made from layers of such elements embedded in a polymer resin. The typical process for forming a composite structure entails building a stack of layers or plies of composite material and embedding the entire stack in the polymer resin matrix. In this situation, each ply can be the same or different material and the fibers in each ply can be wrapped with different braiding patterns to satisfy pre-specified requirements of a particular structure.

The processes and the apparatus for the fabrication of such composite elements and assemblies are well known to persons of ordinary skill in that art. The processes include pultrulsion and resin transfer molding, and the fiber materials, which have included aramid, kevlar, glass, carbon, graphite, ceramics and a variety of metals, are immersed in a polymer matrix material. Typically, the polymer matrix material is a thermoset resin such as polyester or epoxy resin, or it can be a thermoplastic resin such as nylon, polypropylene, polycarbonate, etc.

Sublimation printing is a process that has long been known for the purpose of imprinting indicia (alphanumeric data, designs, logos, etc) onto an article. Generally, sublimation is a direct transformation from a solid state to a vapour state, and special sublimable inks, prepared on articles, such as sheets of fabric, paper or the like, transfer by sublimation from the sheets to the articles to be printed or decorated when the sheets are held adjacent to the articles and then heated.

Sublimation printing or decoration has many advantages compared to other decoration processes. In fact, in sublimation printing, vapors of the ink penetrate the article being printed and generate vivid and very pleasant, decorations of virtually no thickness.

The best results are achieved with some plastic materials for the penetration in those plastic materials of sublimable inks, but it is well known that nearly all materials may be sublimation-printed if a an adherent paint layer is previously applied on the same. For example, Sublimation printing of substantially flat articles is easily realizable and is generally carried out with hot presses or irons, which press sublimable ink-bearing sheets into intimate contact with the articles to be decorated.

Typically, the temperature desired to effect sublimation printing is between about 180 degrees C. and 215 degrees C., depending on the inks and colors utilized, and the pressure must be sufficient to ensure a direct touch between the plates and the articles.

Many manufactured articles require labeling on exterior surfaces for environmental, aesthetic, identification or safety reasons. As a rule the exterior surfaces do not lend themselves to printing of indicia which is visually distinct and easily recognizable. As an example, most composite articles have optically dark surfaces due to coloration of the resin and fiber mixtures. Thus, when imprinted with designs or indicia, the resultant image is difficult, if not nearly impossible, to see.

One approach to this problem has been suggested by U.S. Pat. No. 6,004,900 to O'Brien, III. In that patent, the inventor discloses an article made of "unconventional" composite materials and a method of manufacture of the article, in which the article carries an image applied through a sublimation printing process. The patentee describes, as the state of the art, the manufacture of composite articles having an outermost surface that provides an optically light color for application of visually distinct sublimation print, as a process that consists of the steps of forming the article from "conventional" composite materials, coating the surface of the article with an "unconventional" optically light surface ready for application of visually-distinct sublimation print, and sublimation printing on the optically light surface.

In contrast, the composite article of the patent is manufactured by incorporating into the resin mixture an optically-light coloration additive, such as titanium dioxide, which following curing of the article, renders the surfaces of the article ready for application of visually distinct sublimation print.

In another approach, U.S. Pat. No. 5,811,371 to Egashira et al. discloses an article made of materials other than composite materials which includes a first "image receiving sheet" comprising a base sheet and a second receiving layer for receiving a dye or pigment applied through a sublimation printing process, where the receiving layer contains a white pigment, specifically a pigment such as titanium dioxide.

Thus, it appears that evolution of this technology, i.e., the science of applying an image to otherwise optically dark surfaces of an article comprised of composite materials via sublimation printing techniques, has moved in the direction of adding a whitening agent to the uncured resin used in forming the composite article, thereby altering the optical properties of the outer surface of the article on which an optically-distinct image is to be applied after curing of the article.

In contrast, and against this background of known similar technology, the applicant has developed a novel article made of composite materials and resin, as mentioned above, and a method for fabricating the article, in which an optically-distinct image is "applied" to the article prior to curing and remains optically-distinct, after curing of the article, against the ordinarily optically dark coloration of a cured conventional, non-optically enhanced, resin.

More specifically, the invention encompasses an article formed from composite material, including conventional fibrous material and conventional resin material, which, after curing, includes one or more regions exhibiting an image which had been applied prior to curing to the one or more regions in the stack of uncured composite layers, through a sublimation printing process.

OBJECTS AND SUMMARY OF THE INVENTION

It is therefore an object of the present invention to provide a novel article and process for forming the article, wherein the article is fabricated from stacked layers of conventional composite material between and around which a conventional curable resin has been placed, and which, after curing, yields a composite article that exhibits an image on one or more surfaces of the article. The article and process of the present invention have been developed for the purpose of overcoming all of the shortcomings and disadvantages of previously known and similar articles formed of composite materials and exhibiting images applied through sublimation printing.

In one aspect of the present invention, constituent fiber layers of a composite structure are arranged according to predetermined final properties desired in the cured structure and "conventional" resin material is placed between and around the layers, and before the so-formed composite structure is subjected to curing steps, a layer of polyester-based material having image information applied thereto via sublimation printing, is secured about one or more surfaces of the composite structure with a conventional resin mixture, so that following curing of the composite structure and resin, the outer surface(s) exhibit the sublimation print.

In another aspect of the present invention, there is provided a process for forming an article of composite material which includes the steps of forming an uncured composite article using a stack of layers of "conventional" composite fiber material and a "conventional" resin mixture, applying atop one or more surfaces of the uncured composite article a sheet of material having an image made through sublimation printing, covering with a "conventional" resin mixture the uncured composite article and applied sheet of material bearing image information applied through sublimation printing, and curing the so-formed article.

Other objects, advantages and features of the invention will become more apparent, as will equivalent structures which are intended to be covered herein, with the teaching of the principles of the invention in connection with the disclosure of the preferred embodiments thereof in the specification, claims and drawings in which:

DETAILED DESCRIPTION OF THE INVENTION

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide a novel construction and method for fabricating an article of composite material having on at least one surface thereof an image for via sublimation printing.

Figure 1:
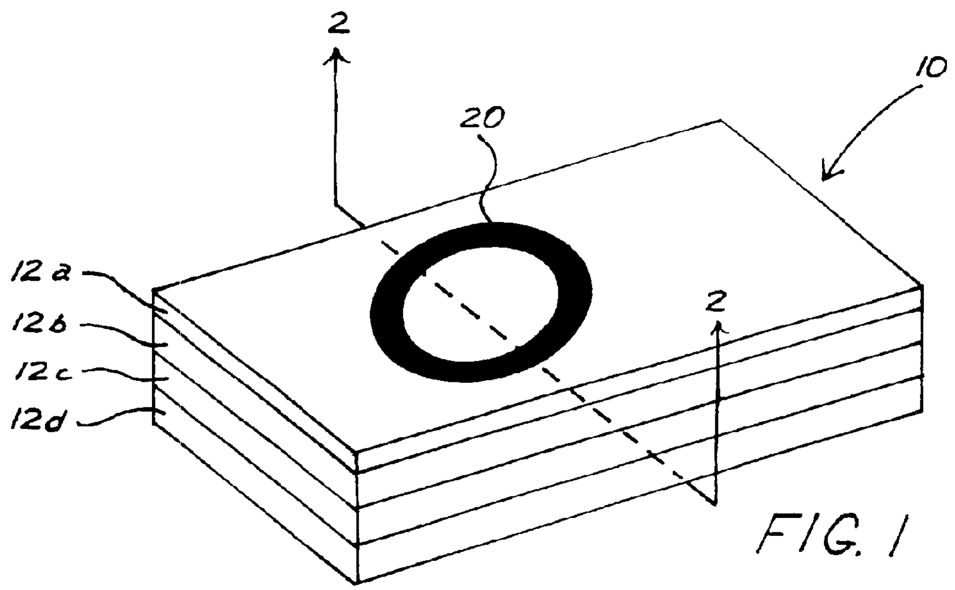
FIG. 1 depicts an article of composite material according to the teachings of the present invention.

Referring now to the FIG. 1 of the drawing, an article 10 made of composite material is shown to include layers or plies 12*a*, 12*b*, 12*c* . . . disposed adjacent to one another in a stack. In accordance with the teachings of the present invention, one of the plies, such as the upper ply 12*a*, will be visible to an observer in the finished, cured, article, and will bear a graphic or symbolic information (alphanumeric characters, bar coding, color coding, etc.) applied via a sublimation printing process.

Various articles, including boat hulls and masts, the outer skins or aircraft and other vehicles, sporting equipment, furniture, shelving, etc., are desirably manufactured using composite structures. Each of these articles often require some form of labeling or decoration for identification, warning, or advertisement. For example, equipment or vehicles can be marked for identification or decorated with camouflage, while identifying indicia and manufacturing logos can be applied to articles which form the bulk of a retailer's inventory.

The outer layer or ply 12*a*, which in the present invention is the layer that bears the graphic or symbolic representations, comprises a constituent part of the cured composite article, as distinguished from a layer or coating that is applied to the otherwise complete and cured article, and is only for information conveying purposes. It is to be understood that the depiction in FIG. 1 of the layer 12*a* as being the layer that is on top of the stack 10 and which bears the image or information is solely for purposes of illustration, and it is further to be understood that one or more layers 12*a* could be positioned on the one, two or all outer facing sides of the stack of layers.

Preferably, the outer layer or ply comprises a thin sheet of veil or polyester material, woven or nonwoven, and the image 15 is printed on the outer, to-be-viewed, side using a sublimation printing process.

Figure 2:
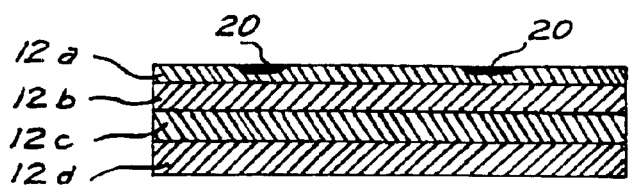
FIG. 2 is a schematic cross-section taken through the article shown in FIG. 1 along section lines 2—2.

FIG. 2 is a cross-sectional representation of the cured composite article taken along section lines 2—2 in FIG. 1 showing that the image on the surface 22 of the article does not stand above the surface of the layer on which the image has been applied This is because the image has been applied using a sublimation process wherein the dye used to form the image is not deposited on the layer as in conventional printing processes but rather is more aptly desribed as being absorbed into the material of the layer on which the image has been applied. The result is that when one runs his/her hand over the image on the layer, he/she only feels a smooth, unflawed, surface.

Figure 3:
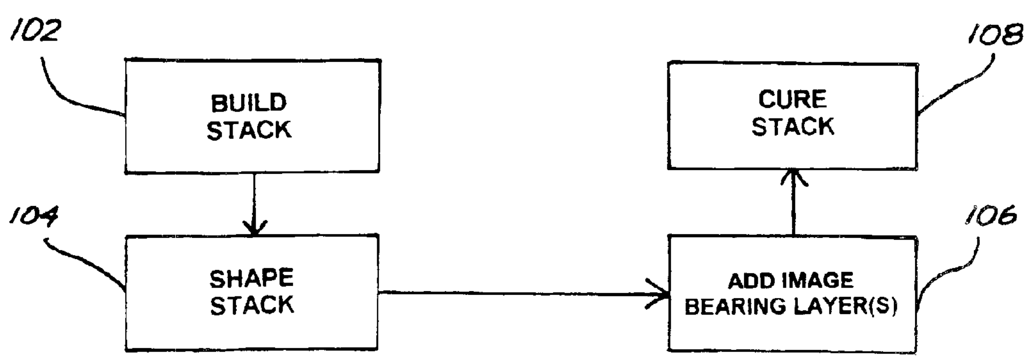
FIG. 3 is a flow chart depicting the sequence of steps involved in the process for forming the article shown in FIG. 1

Referring now to FIG. 3, there is shown a flow chart depicting the steps of the process for fabricating the article shown in FIG. 1. As shown, the first step 102 in the process in accordance with the teachings of the invention is to assemble a stack of plies or layers 12*a*, 12*b*, 12*c*, . . . atop one another to build up the composite article, choosing the properties and orientation of fibers in each layer in such a manner that desired properties will be obtained when the article is cured and ready for use. Preferably, the plies in the stack are made from "conventional" composite materials (such as those described above) and a "conventional", chemically and/or optically unaltered, curable resin material of the type typically used in the formation of composite articles. Step 104 of the process entails shaping the stack of composite materials into a near final shape that is desired to be obtained. The shaping can take place during build-up of the article or following placement of the layers during the build-up of the stack from which the article will be formed. Step 106 entails disposing a layer of non-composite material over at least one surface of the stack of plies and incorporating the layer of non-composite material into the stack using the "conventional" resin material. Preferably, the layer of non-composite material comprises veil, polyester, or other polymeric materials with similar material and chemical properties, and the layer has an image formed on a surface thereof. Preferably, the image has been formed on the layer using a sublimation printing process. The non-composite layer is arranged on the stack so that the image faces away from the stack. Step 108 entails curing the so-formed and shaped (where desired) stack.

Those skilled in the art will appreciate that various adoptions and modifications of the invention as described above can be configured without departing from the scope and spirit of the invention Therefore, it is to be understood that, within the scope of the appended claims, the invention may be practiced other than as specifically described herein.

What I claim is:

1. A composite article, comprising:

a plurality of plies of composite material arranged atop one another in a stack and bonded together with a resin material, said stack including a layer disposed on at least one outer surface of said stack, said layer bearing an image, said image having been applied by a sublimation printing process prior to curing of the resin material in said stack of layers.

2. The composite article of claim 1, wherein said layer comprises a polyester material.

3. The composite article of claim 1, wherein each of said plies exhibit unique mechanical properties.

4. The composite article of claim 1, wherein said image comprises a logo.

5. The composite article of claim 1, wherein said image comprises alphanumeric information.

6. The composite article of claim 1, wherein said stack forms an article comprising sporting equipment.

7. The composite article of claim 1, wherein said stack comprises a sheet and said image covers the entire outer surface of said sheet.

8. The composite article of claim 7, wherein said sheet is non-planar.

9. A process for fabricating an article of composite material, comprising:

a first step of forming a stack of plies made from composite materials and an uncured resin material, a second step of disposing a layer of non-composite material over at least one surface of said stack of plies and incorporating said layer into said stack using said uncured resin material, said layer having an image previously applied to a surface thereof using sublimation printing, said image facing away from said stack, and a third step of curing the resin in said stack.

10. The process of claim 9, and further including the step of disposing a sealing material about said stack and said layer prior to curing of the resin in said stack.

11. The process of claim 9, wherein said layer comprises a polyester material and said image consitutes a graphic.

12. The process of claim 9, wherein said layer comprises a polyester material and said image constitutes alphanumeric information.

13. An uncured composite assemblage which when cured forms a composite element, said composite assemblage comprising:

a plurality of plies of composite material arranged atop one another and an uncured curable resin material surrounding and infiltrating said plies, said plies and resin material forming a stack, and a fabric layer disposed on at least one outer surface of said stack, said layer bearing an image formed by sublimation printing, said curable resin also surrounding and infiltrating said layer.

14. The composite article of claim 13, wherein said layer comprises a polyester material.

15. The composite article of claim 13, wherein each of said plies exhibit unique mechanical properties.

16. The composite article of claim 13, wherein said image comprises a logo.

17. The composite article of claim 13, wherein said image comprises alphanumeric information.

18. The composite article of claim 13, wherein said stack is shaped as an article of sporting equipment.

19. The composite article of claim 13, wherein said outer sheet comprises a woven polyester material.

* * * * *